United States Patent [19]

Moyroud et al.

[11] 3,886,566

[45] May 27, 1975

[54] SEGMENTED DISC FOR PHOTOCOMPOSING MACHINES

[76] Inventors: Louis M. Moyroud; Robert Bennett, both c/o Photon, Inc., 355 Middlesex Ave., Wilmington, Mass. 01887

[22] Filed: May 23, 1973

[21] Appl. No.: 363,092

[30] Foreign Application Priority Data

May 25, 1972 United Kingdom ............... 24754/72

[52] U.S. Cl. ................................................ 354/15

[51] Int. Cl. ............................................ B41b 17/32

[58] Field of Search ............. 95/4.5, 85; 354/14, 15, 354/16, 18, 19

[56] References Cited

UNITED STATES PATENTS

| | | | |
|---|---|---|---|
| 2,715,862 | 8/1955 | Moyroud | 95/4.5 |
| 2,720,586 | 10/1955 | Mork | 95/4.5 |
| 3,089,402 | 5/1963 | Sausele | 95/85 |

*Primary Examiner*—John M. Horan

*Attorney, Agent, or Firm*—Curtis, Morris & Safford

[57] ABSTRACT

A composite disc matrix comprised of a plurality of individually, independently changeable segments. Each glass segment is automatically centered and aligned by the use of a curved surface rigidly attached to the segment that can be removably securred to a matching curved surface rigidly mounted on the shaft or hub of the rotating matrix. "Pi" characters can be added to a rigid matrix by matching or aligning reference marks associated with the pi characters with corresponding reference marks on the matrix. Pi characters may be mechanically or optically positioned on the matrix.

5 Claims, 10 Drawing Figures

Patented May 27, 1975

3,886,566

4 Sheets-Sheet 3

FIG. 10

TYPICAL SEGMENT

| SEQUENCE | ROW 1 LLC | ROW 2 LLC | ROW 3 LC | ROW 4 LC | |
|---|---|---|---|---|---|
| 1 | BLANK | BLANK | BLANK | BLANK | |
| 2 | • PERIOD | , COMMA | , COMMA | • PERIOD | |
| 3 | ffi | E | e | / | |
| 4 | ffi | T | t | 2 | |
| 5 | ff | A | a | 3 | |
| 6 | ae | I | i | 4 | |
| 7 | fi | N | n | 5 | |
| 8 | fl | S | s | 6 | |
| 9 | oe | O | o | 7 | |
| 10 | — EM DASH | R | r | 8 | |
| 11 | & | H | h | 9 | |
| 12 | ? | D | d | 0 | |
| 13 | ! | L | l | $ | |
| 14 | — BASERULE | U | u | @ | |
| 15 | ✱ Ast. | C | c | /Frac. | |
| 16 | ¢ | F | f | % | |
| 17 | PAR ( | M | m | ) PAR | |
| 18 | + | Y | y | — HYP. | |
| 19 | : | W | w | ; | |
| 20 | “ | P | p | ” | |
| 21 | EM Lead. | G | g | EM Lead. | |
| 22 | EN Lead. | B | b | EN Lead. | |
| 23 | J | Y | v | j | |
| 24 | X | K | k | x | |
| 25 | Z | Q | q | z | |
| 26 | ○ BULLET | = | \| VERTICAL RULE | £ | SUPERSHIFT |
| 27 | □ SQUARE | FOCUSING TARGET | ] | [ | |
| 28 | Ⓡ REF. CHAR. | Ref. char. | Ref. char. | Ref. char. | |

SEGMENTED DISC FOR PHOTOCOMPOSING MACHINES

BACKGROUND AND BRIEF DESCRIPTION OF THE INVENTION

The present invention relates to a segmented character matrix disc which is used with photocomposing machines. Prior art discs as described in U.S. Pat. No. 2,790,362 lack flexibility because if for example there are eight type faces per disc, the composition of text requiring the mixing of type faces located on different discs is highly impractical.

Film "strips" or segments such as used in machines commercially known as "Photon 713" are not completely satisfactory because of lack of rigidity of the film strips, even when they are secured in a metal frame as shown in U.S. Pat. No. 3,643,559. The use of curved glass segments has posed very serious problems which to date have not been economically solved. Plastic segments have even more inherent instability than film. It has been found, after 26 years of experience that the best matrix that can be used in a photographic type composing machine is the glass disc. Emulsion on glass is commercially available with a wide range of characteristics. Glass is stable and remains unaffected by heat and humidity.

The present invention describes an improved "composite disc" matrix comprised of a plurality of individually changeable "segments." A characteristic of the invention resides in the fact that each glass segment is automatically centered and aligned by the use of a curved surface rigidly attached to the segment that can be removably secured to a matching curved surface rigidly mounted on the shaft of the rotating matrix.

The foregoing features will be more fully explained in the detailed description which follows:

FIG. 10 is a chart representing a typical segment of a matrix disc, including alphanumeric characters, "pi" characters, special functions, etc.

DETAILED DESCRIPTION OF THE INVENTION

Figure 1:
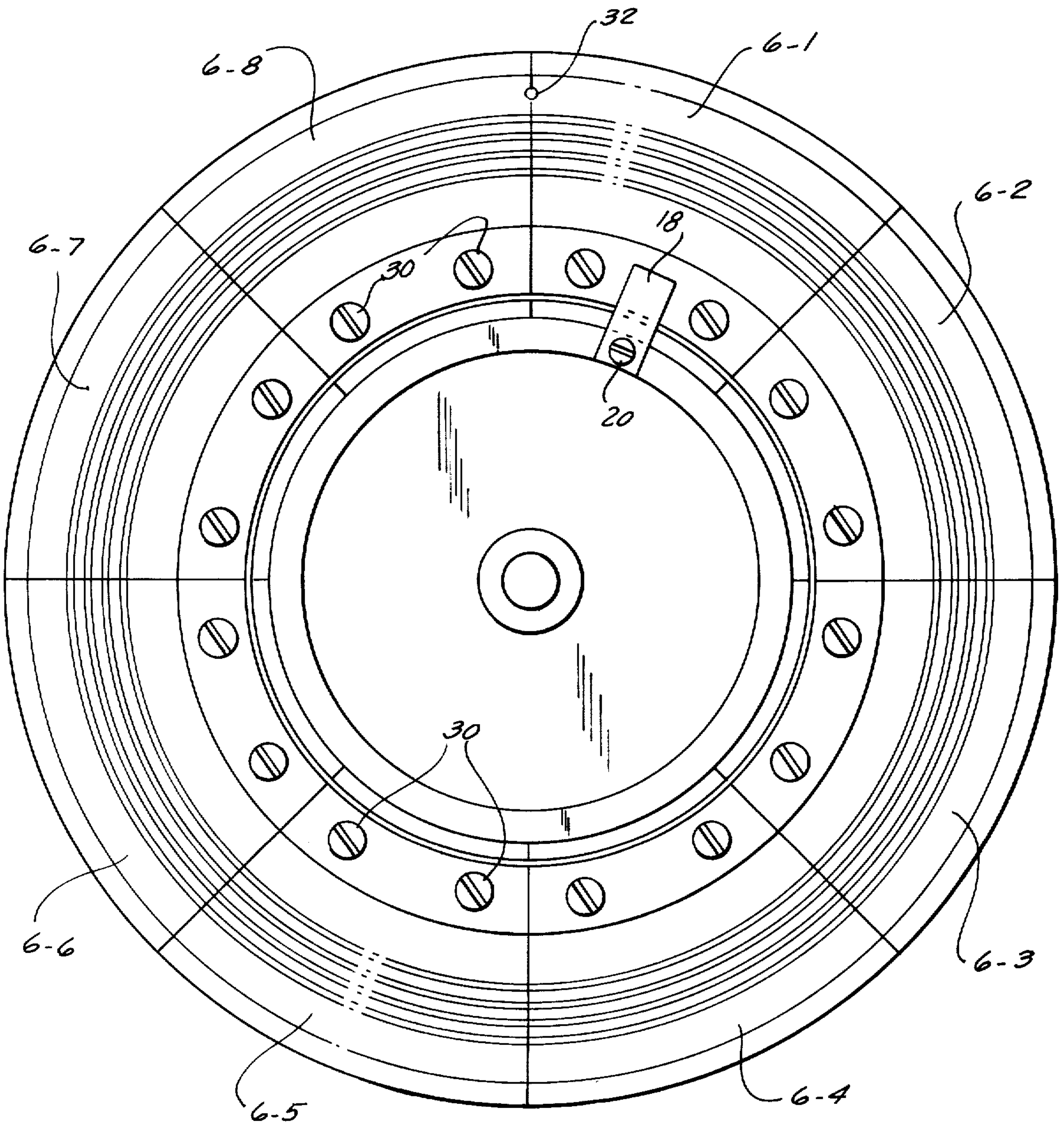
FIG. 1 depicts an array of eight matrix segments assembled into a composite disc.

FIG. 1 shows an array of eight matrix segments assembled into a composite "disc." These segments are shown at 6-1 to 6-8.

Figure 2:
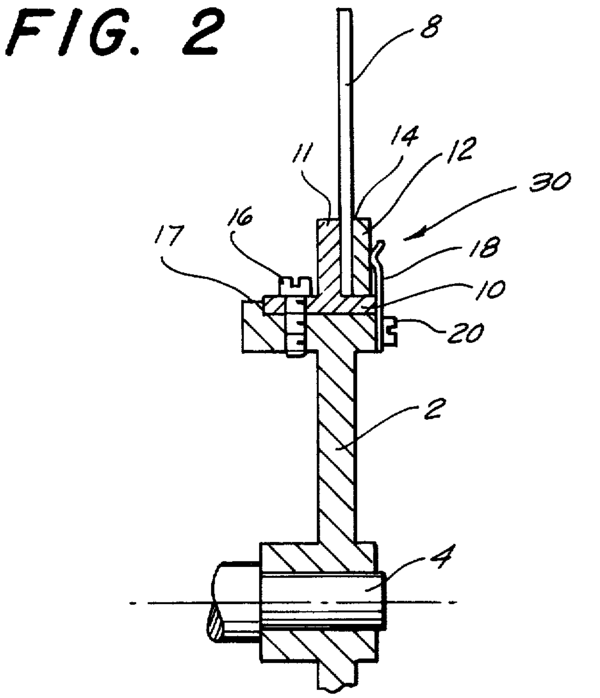
FIG. 2 shows an end view of a glass matrix section or segment, as well as a sectional view of the supporting hub.

Each segment, as shown in FIG. 2 is composed of a glass "matrix" section 8, attached to a rigid base 10. This base has an arcuate bearing area 22 (FIG. 3) to match with the outside periphery of drum 2. In addition, each segment base 10 has a shoulder 11 against which the glass matrix segment is secured by screws 30 forcing a strip 12 against the glass through a resilient material 14. Further, after alignment (if necessary) each glass segment is cemented in place against said shoulder. Each segment is secured to the matrix drum through screws such as 16. Further, each segment before it is secured by said screw, is pushed against a shoulder 11, integral with base 10, through a spring 18 secured by screws 20.

Figure 4:
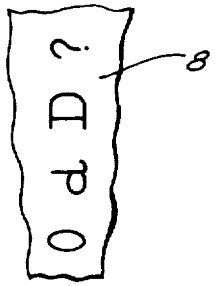
FIG. 4 represents a section of a character array of four rows.
Figure 3:
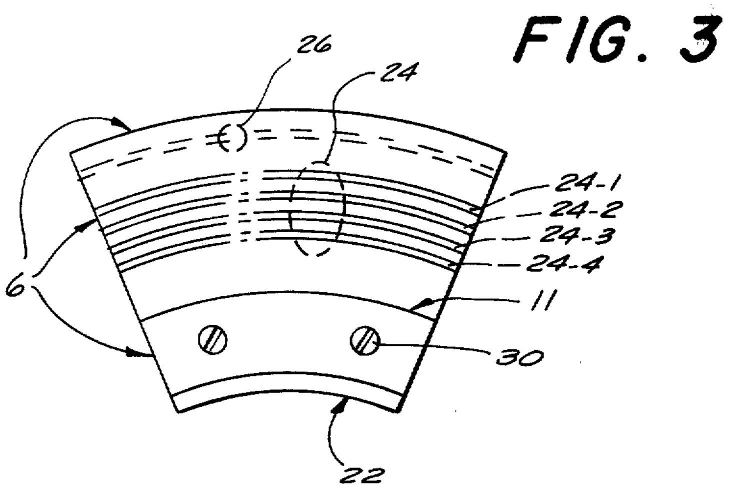
FIG. 3 is a front view of a segment showing a plurality of character rows.

Through the combined action of the curved base of each segment, the outside surface of drum 2 and its shoulder 17, each segment is accurately and automatically positioned so that the character rows appearing on each segment and as shown at 24 in FIG. 3 are concentric with the axis of supporting shaft or hub/4, are at the exact distance from said shaft and are also located in a plane perpendicular to said shaft, said plane being in the "object" plane of the optical system of the machine. A section of a character array of four rows, (representing a complete "alphabet") is shown in FIG. 4.

Figure 5:
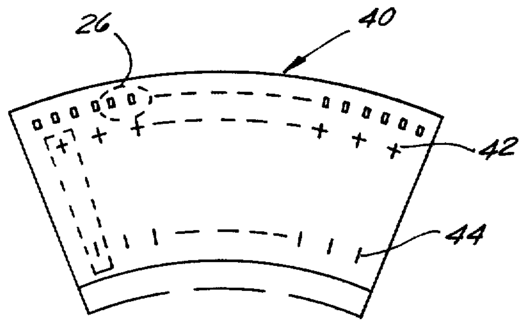
FIG. 5 is a front view of a character segment depicting reference marks for "pi" characters.
Figure 6:
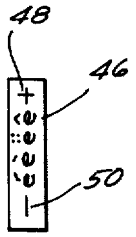
FIG. 6 represents a "pi" character strip with associated reference marks.

It is highly desirable in a photocomposition machine to be able to add to a rigid matrix infrequently used characters called "Pi" characters. A first solution to the problem is shown in FIGS. 5 and 6. In the case of these FIGURES, a "blank" segment 40 is utilized. This segment bears no characters. However, it is provided with timing marks 26 (as described in U.S. Pat. No. 2,790,362), and reference marks 42 and 44. The latter are projected in the same way as characters at the time the matrix is made, for example, as explained in U.S. Pat. Nos. 2,715,862 and 2,951,428.

Each "Pi" unit could be comprised as shown in FIG. 6. It comprises one or more characters located on a narrow strip of film 46. This strip of film is provided with reference marks 48 and 50, which are adapted to "match", overlay or coincide with reference marks 42 and 44. Each film strip can be attached at the desired location by observing the coincidence of the glass segment and the film strip reference lines. After positioning, each film strip can be attached to the glass base by any appropriate means (for example, each segment could be provided with a sticky or adhesive base).

Figure 7:
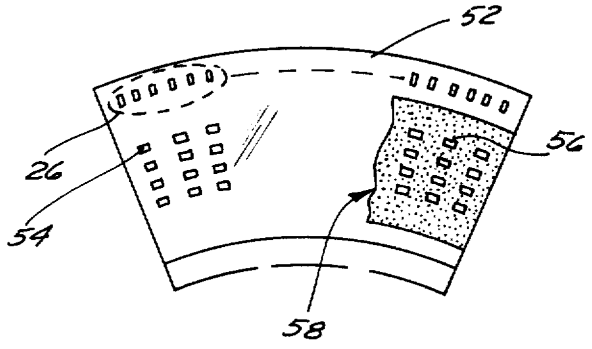
FIGS. 7 and 8 represent a front and sectional end view, respectively, of a segment showing an alternate embodiment of a "pi" character arrangement.
Figure 8:
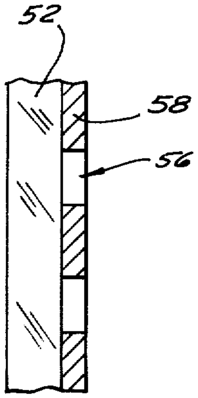

In the embodiment of FIGS. 7 and 8, the individual "Pi" characters are mechanically (rather than optically) positioned. A segment 52 is first produced on the matrix making machine. It is provided with the usual timing marks 26. In addition, "character boxes" which are transparent on an opaque background are also produced at the usual position of the matrix characters. Each box is exactly located in relation to timing marks, such as the reference marks of the above example. Each box is slightly larger than the maximum character area. Using the glass segment as a "master", a thin metal plate 58 is engraved so that a well-defined hole 56 is produced on plate 58 at each character location.

Figure 9:
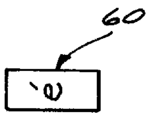
FIG. 9 depicts a "pi" character "chip" on an appropriate support wherein the character is exactly positioned within a small area.

Individual matrix character "chips" on an appropriate support (such as film) are produced on a special camera so that each character is exactly positioned within a small area 60, (see FIG. 9).

The metal plate 58, after etching, is cemented to the glass holder as shown in FIG. 7 so that each transparent window of the glass exactly matches each "hole" of the metal plate. Each small "Pi" character chip can thus be inserted into a "hole" where it will be secured either through elasticity (of the chip itself) or through a "sticky back" adhesive material.

A special "Pi" inserting instrument can be utilized. Such an instrument may comprise a small flexible hose or tube and a resilient ball attached thereto so that a chip can be removed or inserted by appropriate manipulation of the resilient ball, the instrument utilizing fluid pressure principles such as pneumatic or vacuum pressure.

FIG. 10 depicts a chart of typical segment of a matrix disc, including alphanumeric characters, "Pi" characters, special functions and the like.

The foregoing description is intended to be illustrative only. Various changes or modifications may occur to those skilled in the art. It is understood, therefore, that all such modifications which would be apparent to one skilled in the art are included in the scope of the present invention.

What is claimed is:

1. In a photographic type composing machine:

a composite matrix disc mounted on a cylindrical hub, said composite matrix disc comprising a plurality of independently interchangeable segments, each of said segments having an opaque surface and an array of transparent characters thereon; a base provided with an arcuate surface having the same curvature as the outside of said hub, said segments being secured to said base in alignment with each other, whereby each character-bearing surface of each segment is automatically centered and positioned in a plane perpendicular to the axis of said hub by the engagement of the matching surfaces of said hub and said arcuate surface of said base; said hub having an annular radially outwardly extending shoulder formed thereon and the base of each of said segments having an edge portion extending generally perpendicularly to its arcuate surface for abutting engagement with said shoulder, whereby all of the segments in said disc are located in the same plane relative to said hub.

2. The composite matrix disc of claim 1 wherein each of said segments are pie-shaped.

3. The composite matrix disc as defined in claim 1 wherein said segments each comprise a matrix, an a metal plate having a plurality of holes formed therein secured to said matrix, and individual character chips mounted in said holes.

4. The composite matrix disc as defined in claim 3 wherein said matrix segments have transparent timing slits and boxes photographically produced thereon in precise spatial relation to each other, said holes in said plate having identical dimensions and positions as the boxes on the segment matrix and being in alignment therewith.

5. A method of producing pi characters comprising the steps of:

producing on a light sensitive matrix by photographic means transparent timing slits and transparent boxes in a precise spatial relationship, said boxes having an area slightly larger than the largest pi character, producing by photographic means an etched metal plate so that holes are etched through the plate in identical dimensions and positions as those of the boxes on said matrix, cementing said metal plate onto said matrix so that the etched holes are aligned with said boxes, producing by photographic means individual character chips on a support of substantially the same dimensions and outline as said boxes and holes, and inserting said chips into said holes in accordance with a desired arrangement, said chips fitting frictionally into said holes.

* * * * *